United States Patent [19]

Bradbury et al.

[11] 4,057,193

[45] Nov. 8, 1977

[54] APPARATUS FOR INTRODUCING CONTROLLED AMOUNTS OF PIGMENT INTO THERMOMECHANICALLY FORMED PLASTIC ARTICLES

[75] Inventors: William B. Bradbury, Brielle, N.J.; Robert H. Watts, Cincinnati; E. Timm Scott, Norwalk, both of Ohio

[73] Assignee: PMS Consolidated, Somerset, N.J.

[21] Appl. No.: 650,938

[22] Filed: Jan. 21, 1976

[51] Int. Cl.² .............................................. B02C 18/44
[52] U.S. Cl. .................................................. 241/281
[58] Field of Search ................. 241/34, 186.2, 189 R, 241/191, 197, 280, 281, 186.4, 280, 281; 221/9, 13, 14, 176, 253; 214/309, 311; 144/218, 230

[56] References Cited

U.S. PATENT DOCUMENTS

| | | | |
|---|---|---|---|
| 2,377,443 | 6/1945 | Pallmann | 241/186.4 |
| 2,538,944 | 1/1951 | Miller | 241/189 R |
| 2,989,252 | 6/1961 | Babb | 241/191 |
| 3,447,707 | 6/1969 | Furst | 221/13 |
| 3,679,143 | 7/1972 | Montgomery | 241/280 |
| 3,811,627 | 5/1974 | Bradbury et al. | 241/281 |
| 3,860,182 | 1/1975 | Peterson | 241/189 R |
| 3,946,474 | 3/1976 | Hahn et al. | 144/230 |

Primary Examiner—Granville Y. Custer, Jr.
Attorney, Agent, or Firm—Bruce H. Troxell

[57] ABSTRACT

A micrometer mixer having a rotary cutter with a replaceable shaver means is used to powderize pigment bars and mix it with plastic pieces. The apparatus further has a hopper and chute mechanism and a controllable trigger mechanism to automatically feed the pigment bar to the replaceable shaver means.

5 Claims, 11 Drawing Figures

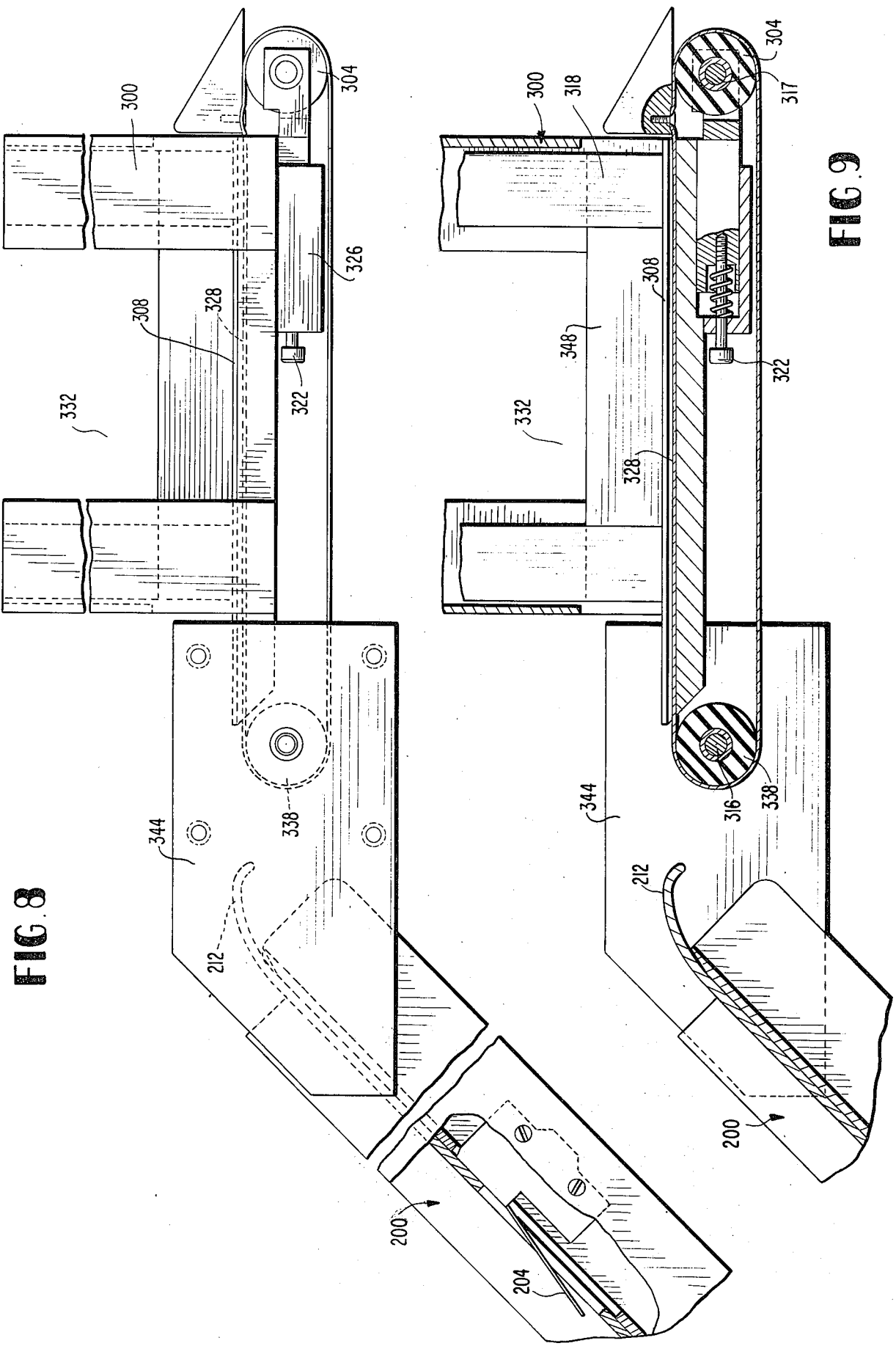

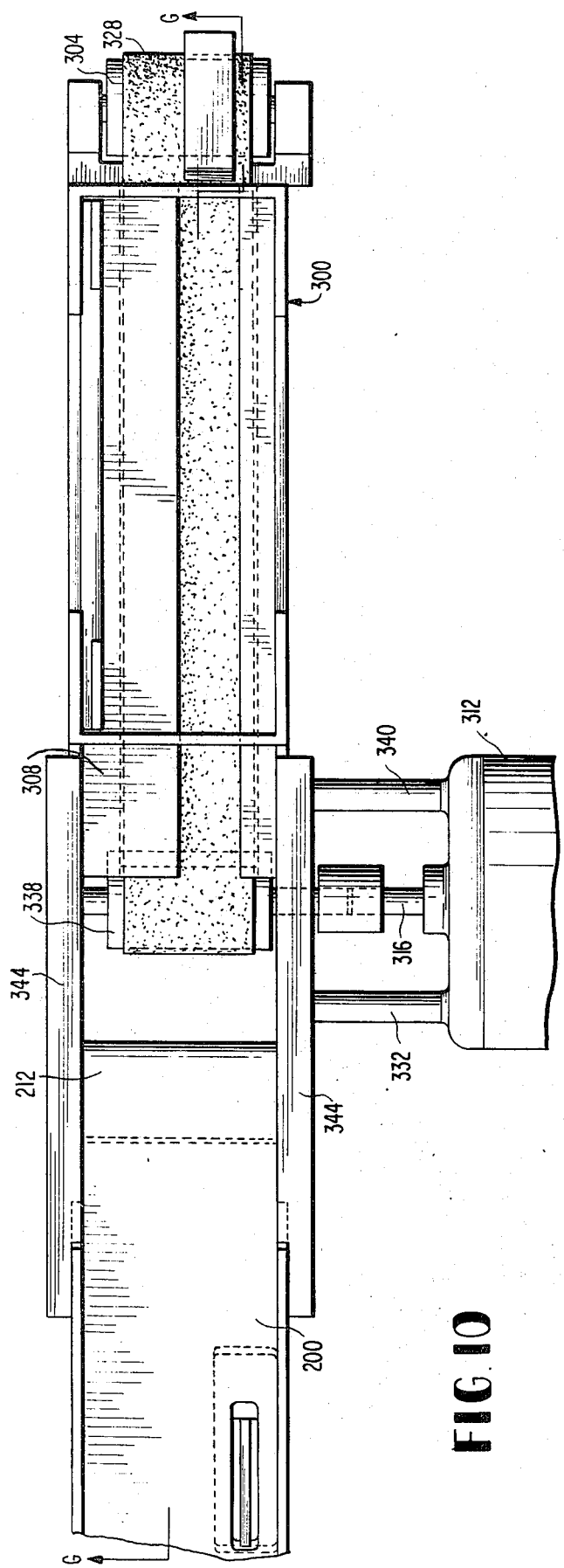
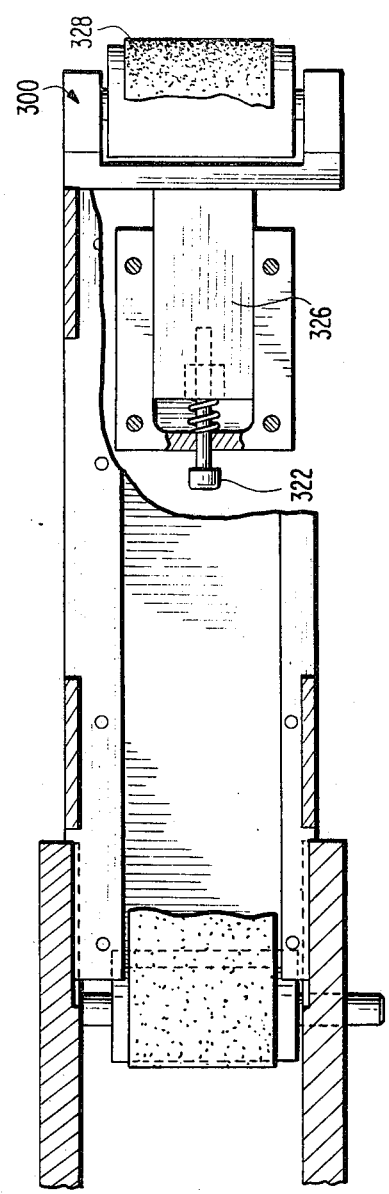
FIG. 10
FIG. 11

APPARATUS FOR INTRODUCING CONTROLLED AMOUNTS OF PIGMENT INTO THERMOMECHANICALLY FORMED PLASTIC ARTICLES

BACKGROUND OF THE INVENTION

1. Field of the Invention

This invention is improved apparatus and an improved method of introducing a pigment into molded plastic articles and more particularly into thermomechanically formed plastic articles.

2. Prior Art

U.S. Pat. No. 3,530,754 teaches an apparatus for introducing pigment concentrate into thermomechanically formed plastic articles. The pigment concentrate is in the form of a long ribbon or strand which is formed from pigment and plastic. At least two pigment strands are fed into a rotary cutting device which continuously cuts off the end of each pigment strand to form sized pigment slices. The pigment slices are stated to have a dimension between 0.001 inch and 0.008 inch. The cutting is achieved by means of a rotary cutting blade working in conjunction with at least two anvils. The pigment strands are cut into slices. Also, the feed rate of the pigment is controlled by the speed of rotation of a feed roller which is operated by a variable speed motor. The amount of pigment cannot be measured by means of a time control which can be preset.

U.S. Pat. No. 2,739,647 discloses an apparatus for simultaneously granulating multiple strips of thermoplastic material for use in an injection molding machine. The ends of the multiple strips are granulated by means of rotating blades. The multiple strips are formed from a continuous sheet which is cut into strips which are of a width regulated by the distance between cutting discs. Very fine grains can be formed, see col. 2, lines 26 to 28, only when the cutting discs have a reduced thickness and when a high speed motor is used with the rotary cutter. So it is seen that very fine grains can only be obtained when only very thin feed material is fed into the rotary cutter.

U.S. Pat. No. 3,529,777 discloses a process of granulating plastic sheets into chips about ¼ inch wide. The sheet is passed through a pair of meshing cutters which cut through the sheet so as to form the chips. The sheet is not comminuted into a fine powder because the chips must always have one dimension which is equal to the thickness of the original sheet. This patent, at col. 7, lines 36 to 38, speaks of obtaining chips which are about 174 inch wide and, at col. 4, lines 63 to 66, speaks of a sheet feed material which has a thickness of about 0.031 inches. So it is seen that a powder material is not contemplated as being obtainable by this patent. A perforated screen is disclosed which causes recirculation of chopped pieces in order to further reduce their size, but the holes in the screen cannot be much smaller than the size of the original chopped pieces or else the build-up of material will back up to a point where the feed sheet cannot be fed into the multiple chopping blades. The chopped up material just compacts into a mass that results in no material passing through the screen holes. The rotating cutters merely spin without any material being recirculated therebetween. Also, the comminuting is not achieved by directing the sheet directly into a rotating cutter.

U.S. Pat. No. 1,764,202 discloses a device for cutting continuous lengths of yarn, thread or filaments into short lengths by means of an apparatus which utilizes a stationary blade and a revolving blade. U.S. Pat. No. 2,143,252 discloses the use of a shearing device having a rotating blade and a stationary blade having a high natural frequency of oscillation. The shearing device is used to cut threads. U.S. Pat. No. 2,850,421 teaches cutting long, synthetic, extruded fibers into short lengths by means of a rotating, single blade disc which achieves the cutting across (perpendicular to) the direction of travel of the long fibers. U.S. Pat. No. 3,350,971 teaches converting a sheet material into chips.

U.S. Pat. No. 3,811,627, the pertinent portions of which are incorporated herein by reference, teaches the use of particular apparatus and method for mixing a pigment into a plastic, whereby the resulting mixture may be molded or thermomechanically formed into a plastic article. Therein a cutter is described as being a spiral cutter having teeth and a rakelike action. Said U.S. Pat. No. 3,811,627 further discloses a basic apparatus and method for mixing a pigment and plastic pieces which mixture is subsequently fed into a plastic article forming machine.

BRIEF DESCRIPTION OF THE INVENTION

This invention is an apparatus for introducing a pigment into plastic pieces in the manufacture of plastic articles. The apparatus includes a rotary cutting means with a replaceable shaver means whereby worn-out or damaged cutting edges may be easily and economically replaced. There is further a feed means whereby a pigment bar can be fed automatically through a triggering mechanism to or against the rotary cutting means. This triggering mechanism and feed means permits a continuous feed of a sequence of pigment bars or the change of a certain-colored pigment bar for that of another color with only momentary loss of pigment feed.

Preferably, then, the means for conveying the thus comminuted pigment is a means for intermixing the comminuted pigment and plastic pieces and for conveying the intermixture to the intake of the plastic article molding machine, normally an extruder or screw injection molding machine.

This invention includes the improved mold features of milling, cutting, or scraping off pigment from a solid pigment bar to form fine shavings or powder. This means that the powderized pigment can be uniformly mixed with plastic pieces as they are fed into the plastic article forming machine. By the apparatus of this invention comminuted, powderized pigment can be uniformly mixed with plastic pieces as they are fed into the chosen plastic article forming machine, at controlled rates. A further advantage is that the blades on the rotary cutting means are easily and quickly replaceable when damaged or worn-out. Further, still, the pigment bar may be easily powderized and mixed with plastic pieces in a controllable, automatic fashion which, in turn, results in an economically improved and desirable fashion. Another advantage of this invention is that the blades thereof do not dull as quickly as do the blades of the apparatus of U.S. Pat. No. 3,811,627.

BRIEF DESCRIPTION OF THE DRAWINGS

FIG. 8 is a side view partially broken away of the hopper mechanism shown in FIG. 1.

FIG. 9 is a partial side cross-sectional view of the hopper mechanism shown in FIG. 1.

FIG. 10 is a top view of the hopper mechanism shown in FIG. 1.

FIG. 11 is a top cross-sectional view partially broken away of the hopper mechanism of FIG. 1.

DETAILED DESCRIPTION OF THE INVENTION

Figure 1:
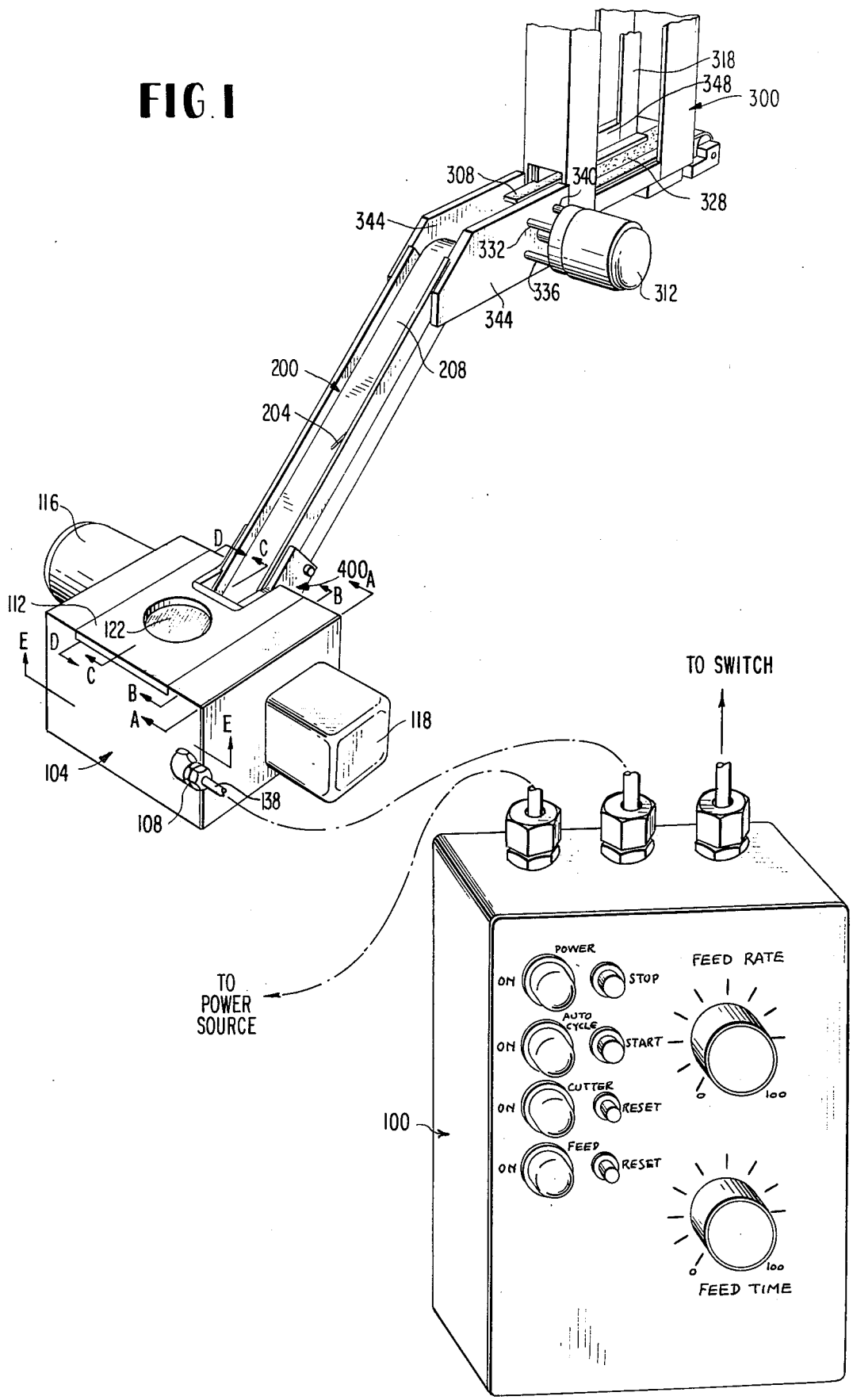
FIG. 1 is a perspective view of the entire apparatus of the invention whereby a pigment bar is comminuted and controllably intermixed with pieces of plastic.

Within the scope of this invention, the pigment is formed in the shape of a bar, i.e., a piece of pigment which has a uniform cross-section along the length thereof and which is relatively long in proportion to its width and thickness. The cross-section of the pigment bar can have any shape, but preferably is rectangular. The bar is preferably uniform along its longitudinal axis, but can have any lengthwise shape, for example, the longitudinal axis can be curved. (Also this invention includes pieces of pigments having non-uniform cross-sections along the length thereof, which, for example, means that the pigment feed means contains floating pigment feed rollers.) The pigment bar usually has sectional dimensions of between 2½ inches by 2½ inches and ¼ inch by ¼ inch, and preferably 1 inch by ¼ inch. The pigment bar usually has a length which ranges between 2 inches and 18 inches. A casting method produces pigment bars which are normally 7 inches in length and have a uniform cross-section of 1 inch by 1¼ inches. An extruder injection method produces pigment bars which are normally 3 inches in length and have a uniform cross-section of 1¼ inches by 1¼ inches.

The apparatus of this invention can be used to prepare and intermix fine powdered pigment with any plastic material, particularly that which may be thermomechanically formed into particles. The intermix can also contain conventional fillers, such as, silica, mica, asbestos, calcium carbonate, carbon black, clay, talc, barium sulfate, magnesium oxide, barium carbonate, ground glass, metal powders, other minerals and synthetic fibers. The intermix can further contain additives such as light-stabilizers, plasticizers and flame retardants. Any type of plastic material may be used as long as it can be formed thermomechanically (e.g., injection molding) or by compression molding into plastic articles.

The fine powdered pigment can be intermixed with monomers or prepolymers which are polymerized when formed into plastic articles. The polymerization can be achieved by means of heat (of compression, etc.) and/or catalyst, so such an intermix can contain additives such as catalysts and accelerators.

The thermoplastic compositions can contain other conventional material, such as, plasticizers, stabilizers, flame retardants, UV absorbers, antistatic additives, etc.

Reinforced thermoplastics can be used. The reinforcing is normally done with glass fibers, fibrous asbestos, metal fibers, refractory fibers, and other fibers.

A bar of any pigment can be used in this invention. The pigment bars are preferably formed from the fatty acid amide coated pigments disclosed in U.S. Pat. No. 3,728,143 issued Apr. 17, 1973, entitled "Pigment Dispersion", commonly assigned to the same assignee as this invention.

The term "pigment" means substances which are generally considered insoluble in the vehicle and pigments generally have the property of light refractivity. (Dyes are considered soluble and generally have only the property of light absorption.) Phosphorescent, luminescent, fluorescent, metalescent, and pearlescent materials fit within the term "pigment", as used herein and in the art. Examples of organic and inorganic pigments which can be used in this invention are iron blue, zinc oxide, titanium dioxide, chrome yellow, carbon black, chrome orange, chrome green, zinc chromate, red lead, lethod red, the lakes, azo type toners, phthalocyanines, aluminum hydrates, lakes, iron oxides, white lead, extenders phosphotungstic acid toners, titanium-containing pigments, sulfur-containing pigments, extenders, calcium carbonate, aluminum oxide, lithopane, ultraphone, lead chromate, cadmium sulfide, cadmium selenide, barium sulfate, azo pigments, anthraquinone and vat pigments, phthalocyanine pigments, acrylamine yellow, magnesium oxide, chrome red, antimony oxide, zinc sulfide, magnesium fluoride and ground barytes. Benzoid pigments are useful and examples are toners and lakes. Examples of benzoid toners are: yellow toners, e.g., benzoid yellows and Hansa yellows; orange toners, e.g., vat orange 3; red toners, e.g., napthol reds; violet toners; blue toners; green toners; brown toners; and black toners. Examples of benzoid lakes are yellow lakes, e.g., acid yellow 2; orange lakes; red lakes; violet lakes; blue lakes, e.g., acid blue 93; green lakes; brown lakes; and black lakes, e.g., natural black 3. Metallic pigments can be used, and examples are aluminum flakes. Mixtures of pigments can be used.

The pigment bars can be prepared by compression molding of pigment particles, casting of pigment particles (the preferred method) and profile extrusion (also called plunger extrusion and extruder injection) of pigment particles.

Usually between about 0.1 and about 10 parts by weight of the pigment are formulated per 100 parts by weight of the plastic in the final plastic article, although the preferred amount of pigment is about 0.5 to about 3.0 parts by weight per 100 parts by weight of the plastic. Extremely high pigment loadings are possible with the pigments, for example, 50 parts of pigment to one part of plastic.

Micrometer mixer 104, chute 200, hopper 300, pigment feeder 400 and control panel 100 are shown in FIG. 1. The micrometer mixer 104 is connected to the control panel 100 via connecting means 108. A pigment bar is fed into hopper 300 equipped with side spacer 308 whereby various sizes of pigment bars may be utilized with stability. Side panels 344 of the hopper 300 also add to the stability factor. Motor 312 is attached to a side panel 344 via attachment means 340, 332 and 336. The pigment bars are carried to chute 200 wherein they then slide down chute path 208 to pigment feeder 400. A trigger mechanism 204 may be utilized whereby when the chute path 208 becomes empty of a pigment bar at the level of the triggering mechanism, a signal, (electrical, mechanical, or otherwise) is transmitted to motor 312 and belt 328 carries a pigment bar to chute path 208. Top plate 112 of micrometer mixer 104 contains an aperture 122 wherein a reservoir of plastic pieces contained in a hopper (not shown) permits an even flow of plastic pieces for intermixing with the comminuted, or powderized, pigment. Motors 116 and 154 (enclosed by motor encasement 118) are provided to power the cutter mechanism (shown in FIG. 7) and the feeder mechanism (shown in FIGS. 3, 4, 5 and 6), respectively.

Figure 2:
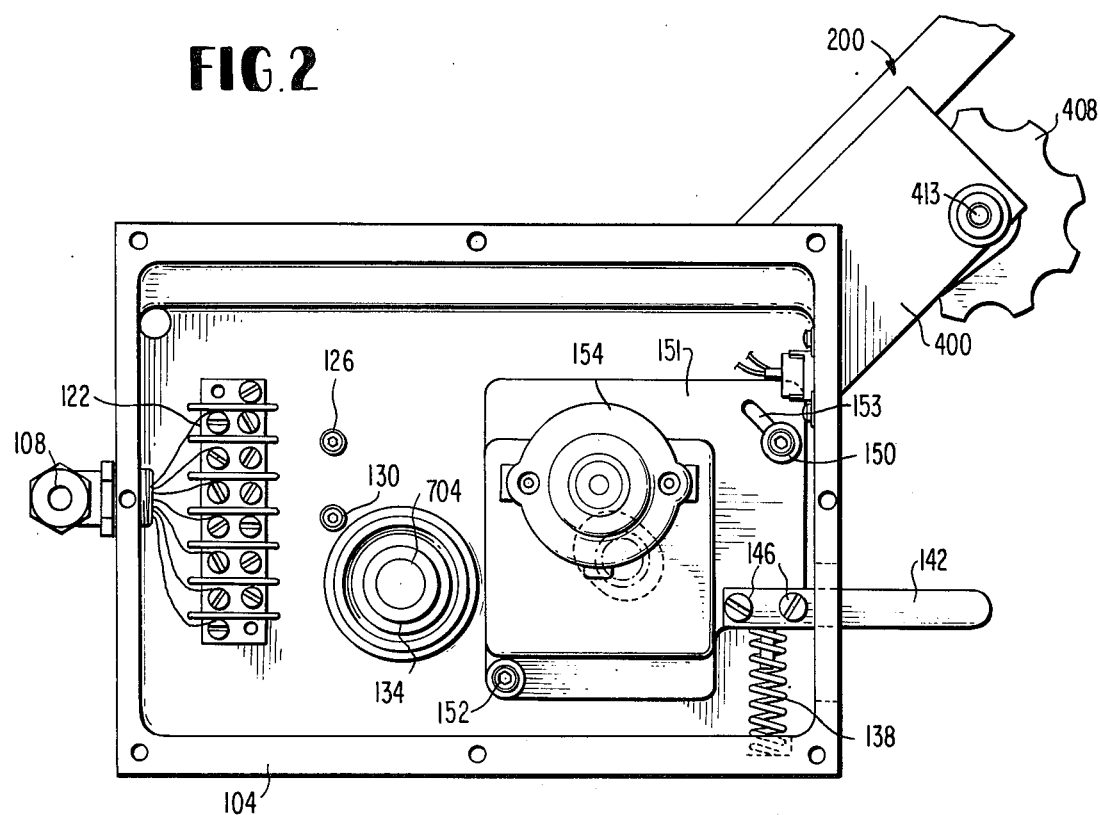
FIG. 2 is a partial side view of the micrometer mixer according to this invention taken along lines A—A of FIG. 1.

Referring now to FIG. 2, which is a cross-sectional side view of micrometer mixer 104 taken along A—A in FIG. 1, power inlet 138 is connected to the inlet side of fuse pack 122. The outlet side of fuse pack 122 is connected to motors 116, 154 and 312 to provide electrical power thereto. These connections may be by any means known in the art and are omitted for purposes of clarity. Hand wheel 408 is connected to pigment feeds 400 via shaft 413 and may be used to manually advance the pigment bar, or withdraw same if it is so desired for any reason, from pigment feeder 400. Also shown in FIG. 2 is gear shaft 704 with necessary bushings 134, and a portion of motor 154. Disengaging arm 142, to which is attached spring 138 via attaching means 146 (e.g., typically screws) is attached to mounting plate 151 (to which motor 154 is mounted) and permits disengagement of the feeder mechanism motor 154 from the drive rollers (to be described hereinafter) by pivoting mounting plate 151 about bolt 152. Slot 153 allows the plate 151 to pivot and still be retained in position by bolt 150. Spring 138 biases the mounted plate 151 in a counterclockwise direction (as seen in FIG. 2) so that the drive motor 154 normally is in driving relationship with the feed rollers. Bolt means 126 and 130 attach feeder 400 to the micrometer mixer 104.

Figure 3:
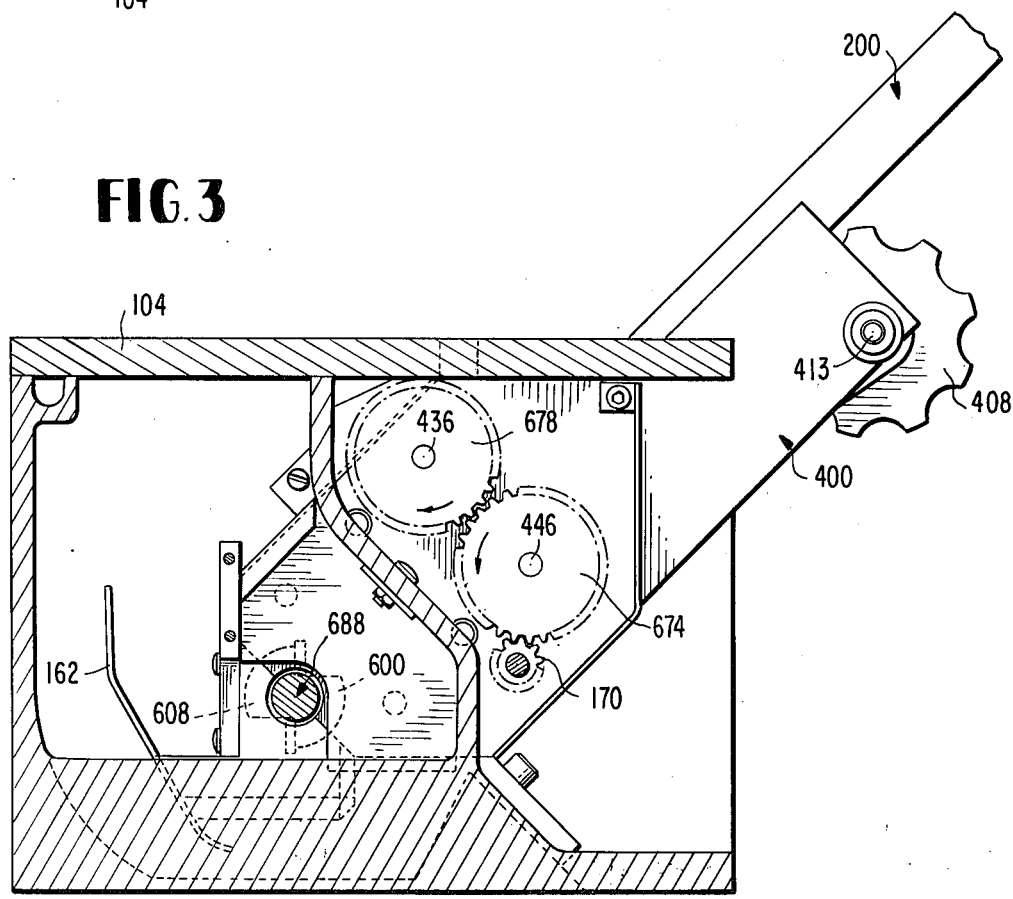
FIG. 3 is a partial side cross-sectional view taken along lines B—B of FIG. 1.
Figure 6:
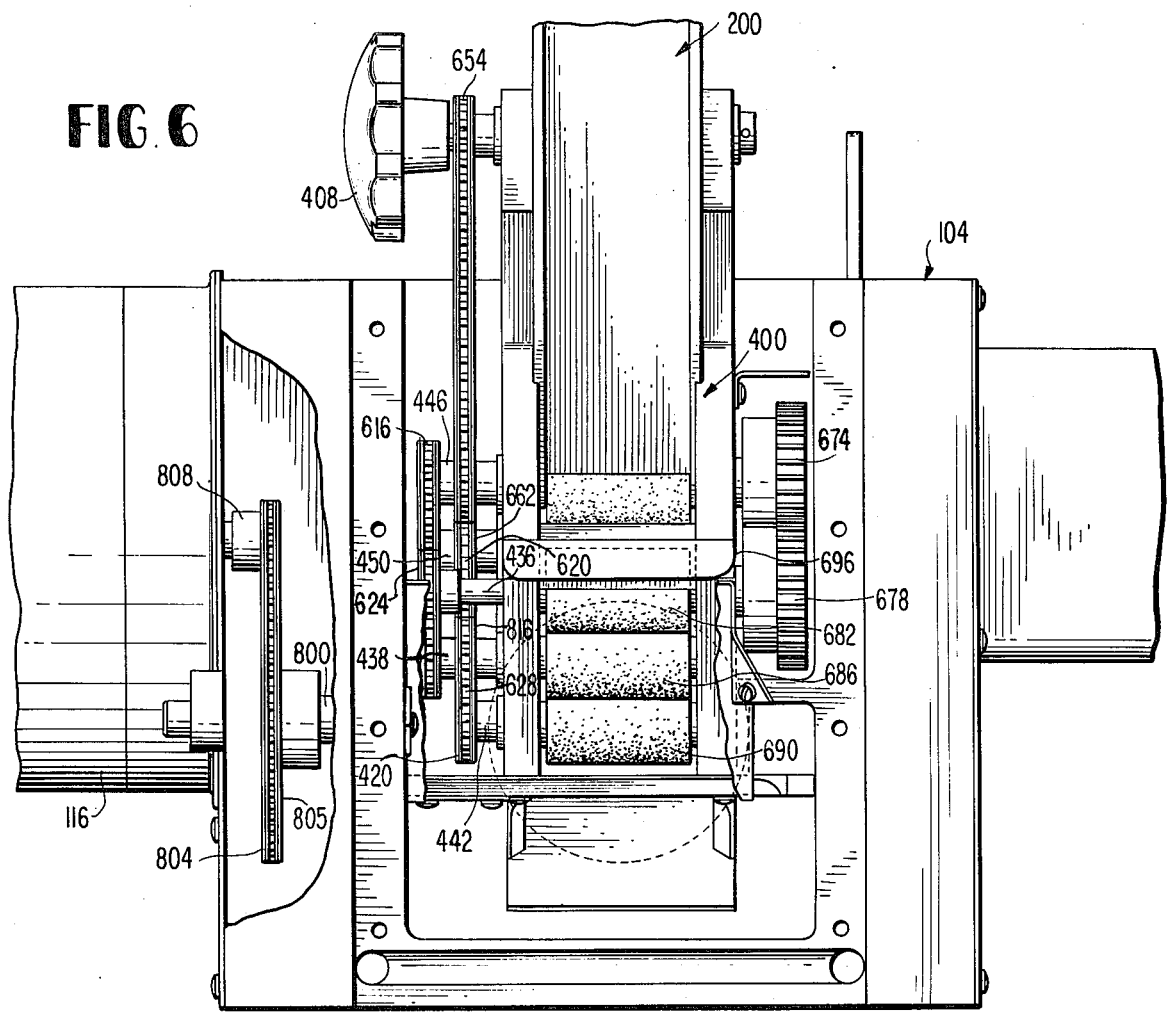
FIG. 6 is a top view partially broken away of the micrometer mixer of FIG. 1 with the top plate removed.
Figure 7:
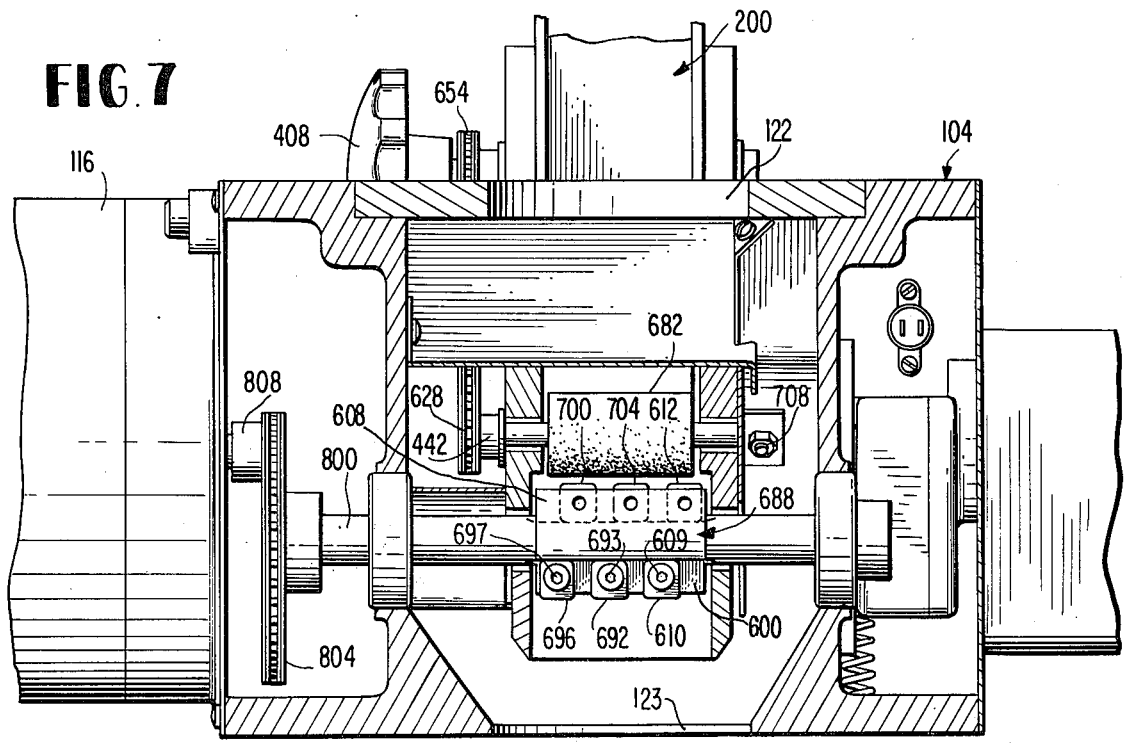
FIG. 7 is a partial front cross-sectional view taken along lines F—F of FIG. 4.

FIG. 3 is a side cross-section of the micrometer mixer 104 taken along the lines B—B in FIG. 1, showing chute 200, hand wheel 408 with shaft 413, pigment feeder 400 with gear means 674 and 678 which turn rollers 690, 682 and 686 (see FIG. 6) for rolling the pigment bar into comminuting means 688 having surfaces 600 and 608 to which the replaceable shavers (or cutter or powderizing means) are attached (see FIG. 7). Gear means 170 driven by motor 154 turns gear means 674 which in turn turns gear means 678 and their respective shafts 436 and 446.

Figure 4:
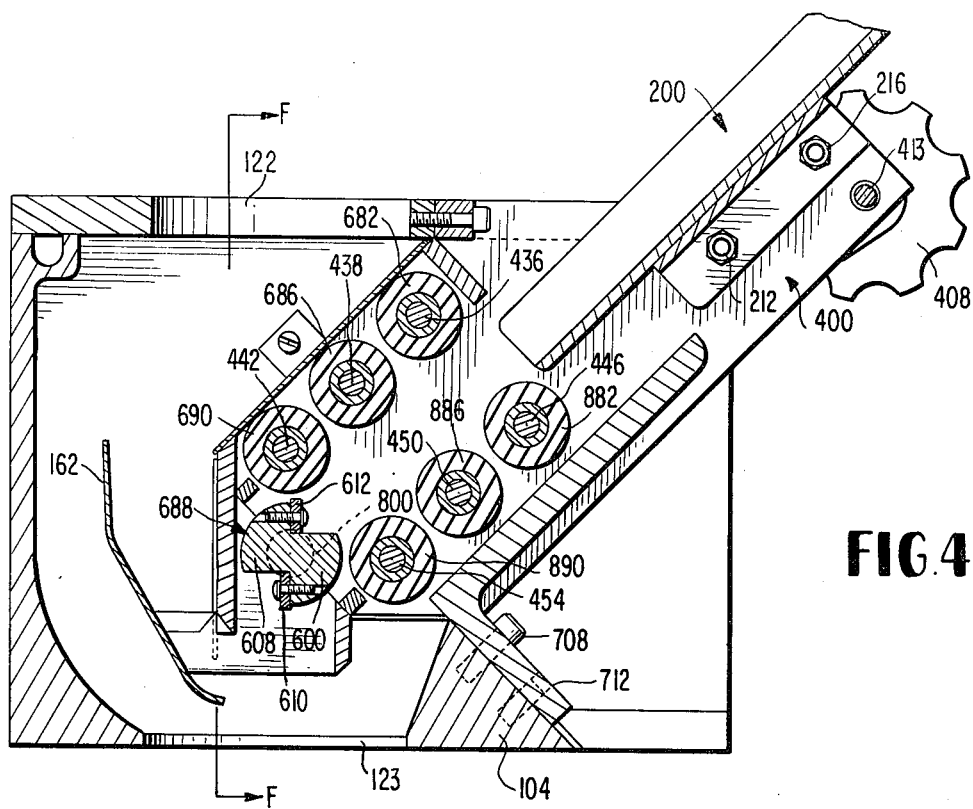
FIG. 4 is a partial side cross-sectional view taken along lines C—C of FIG. 1.

FIG. 4 is a cross-sectional view of micrometer mixer 104 and pigment feeder 400 taken along lines C—C of FIG. 1. In addition to chute 200, hand wheel 408, and baffle means 162 there is shown attachment means 216 and 212 which attach chute 200 to feeder 400. Rollers 682, 686, 690, 882, 886, 890 through shafts 436, 438, 442, 446, 450 and 454, respectively, are rotated through the gearing means described above and below to move the pigment bar to the comminuting means 688 with surfaces 600 and 608, to which are securely attached any number of replaceable cutter means, depending upon the size of the comminuting means 688. In a preferred model, as shown, comminuting means 688 contains two sets of replaceable cutter means, three cutter means in each set, each being securely attached to surfaces 600 and 608. Shown in FIG. 4 are replaceable cutter means 610 and 612. Bolt means 708 and 712 also serve to securely attach the pigment feeder 400 to the micrometer mixer 104. Drive shaft 800 is also shown.

Figure 5:
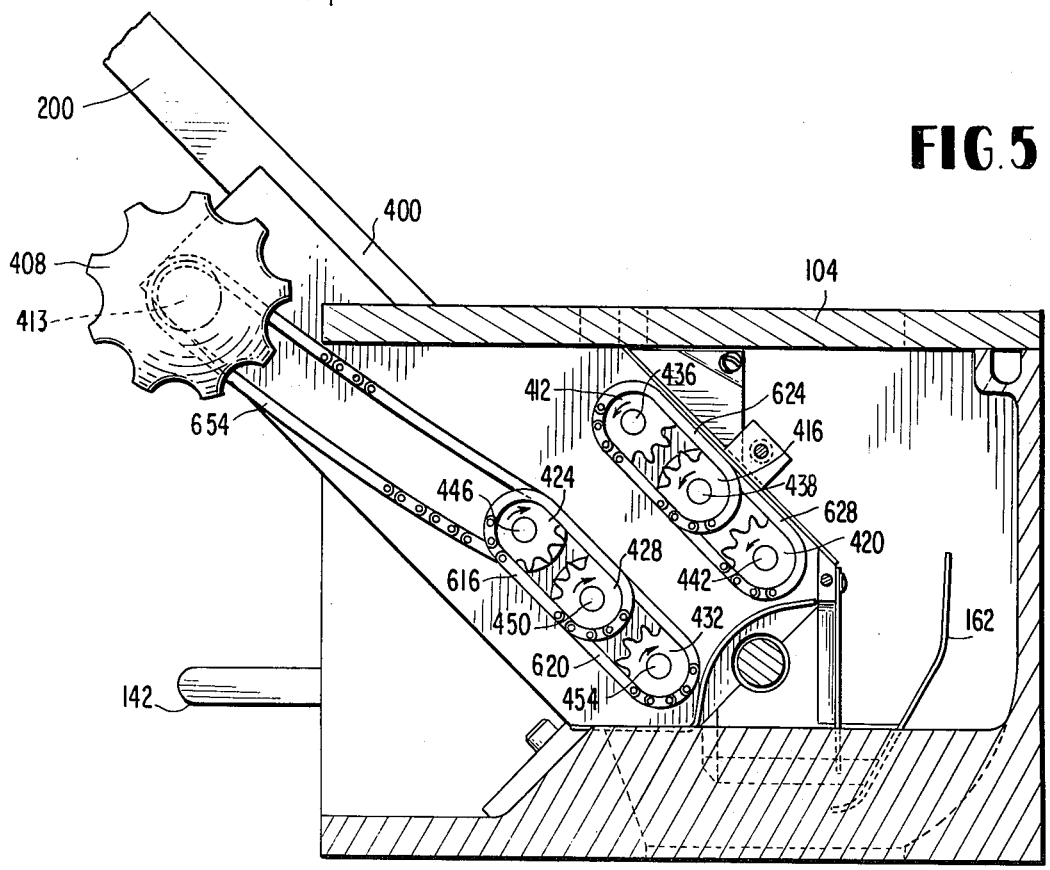
FIG. 5 is a partial side cross-sectional view taken along lines D—D of FIG. 1.

FIG. 5 is a side cross-sectional view of micrometer mixer 104 and feeder 400 taken along line D—D of FIG. 1. Shafts 436, 438 and 442 and gears 412, 416 and 420 attached thereto, respectively, are driven by gear 678 (FIG. 3) through shaft 436 (to which both gears 678 and 412 are attached, and gear chains 624 and 628. Gear shafts 446, 450 and 454 drive gears 424, 428 and 432, respectively, through gear chains 654, 616 and 620 through gear 674 (See FIG. 3). Gear 674 and gear 424 are both connected to shaft 446. Also shown in FIG. 5 are chute 200, shaft 413, disengaging means 142, and baffle means 162.

FIG. 6 is a top view of micrometer mixer 104 and feeder 400 showing the interrelationship of the aforementioned gears, gear shafts and gear chains whereby rollers 682, 686 and 690 are turned.

FIG. 7 is another cross-sectional view of the apparatus of this invention taken along lines F—F of FIG. 4 showing the heretofore described various means and components. Additionally, there is shown a preferred embodiment of the invention wherein two sets of three replaceable cutter means are utilized. As can be seen, each of the replaceable cutter means 610, 692, 696, 700, 704, and 612 are attached to the surfaces 600 and 608 of rotatable comminuting means 688 by fastening means 609, 693 and 697, e.g., screw means. Of course, fastening means for the replaceable cutter means 700, 704 and 612 cannot be seen in this view. Typically the replaceable cutter means are honed to a shaving edge on at least one edge, more preferably on each edge for best comminuting purposes as shown in FIG. 7. While the size of the replaceable shaving means will vary both with the size of the pigment bar and the other dimensions of the micrometer mixer, in one preferred embodiment said cutter means are $\frac{3}{8}$ inch square with a $\frac{1}{8}$ inch thickness. Of course, the cutter means are made out of the most durable material readily available due to the often metallic composition of the pigment bars and, accordingly, are preferably metallic in nature. Thus, rather than having to discard the entire feeder means, or perhaps an entire comminuting means due to dullness or breakage of the comminuting means, a replaceable cutter means facilitates and economizes on the changing of, and use of, the feeder means.

FIGS. 8, 9, 10 and 11 are various views of the hopper and chute mechanism utilized with this invention. In FIG. 8, hopper 300 is has an opening 332 for the pigment bars to be placed atop each other. The individual pigment bars drop onto belt means 328 which is driven by roller means 304 and 338 and shaft means 317 and 316, respectively. Screw means 332 and screw apparatus 326 serve to enable an adjustment of the tension of belt 328 driven by motor 312 via shaft 316 and roller 338. Also shown in both FIGS. 8 and 9 is chute 200 equipped with bottom plate 212. Trigger mechanism means 204 functions in such a manner as to "trigger" the movement of belt means 328 to move another pigment bar onto the chute 200 when the pigment bar(s) have reached a certain predetermined level on the chute 200 at the entrance to the feeder 400 (see previous figures) through a chosen electrical or mechanical system (not shown). FIG. 9 is, of course, a side cross-sectional view of a portion of the apparatus of this invention.

FIG. 10 is a top view of the hopper and its associated apparatus showing belt means 328, bottom plate 212, roller means 304 and 338, motor 312 and shaft 316. The motor is attached to side panel 344 by attachment means 332 and 340 (336 not shown).

FIG. 11 is a further top cross-sectional view of hopper means 300 showing belt means 328, screw means 322 and screw apparatus (or adjusting means) 326.

In the practice of the process of this invention and utilization of the aforedescribed apparatus the following procedures occur: pigment bars are is placed into hopper 300 via opening 332 wherein side panel 348 and back panel 318 are adjusted to secure the bar in stable position. Motor 312 is then activated by triggering mechanism 204 in chute 200 and belt means 328 is driven by roller means 304 and 338 via shaft means 317 and 316, respectively, whereby the pigment bar is carried by belt means 328 to chute path 208 to where it is guided by bottom plate 212. Roller means 304 and 338 turn in a manner whereby belt means 328 transports the bar to chute 200. The bar is thereby made to slide down chute path 208 wherein the bar proceeds into pigment feeder 400. Gear 674 is driven by gear means 170 which, in turn, is driven by motor 154, thereby also turning gear means 678. Shaft 436 from gear means 678 then turns gear means 412, shown in FIG. 5, which via gear chain 624 turns gear 416 attached to shaft 438, shown in FIG. 6, which, in turn, is also attached to gear means 816, which further turns gear chain 628 whereby gear means 420 is made to turn. Accordingly, rollers 682, 686 and 690 are turned. Simultaneously, shaft 446 from gear means 674 turns gear means 424 which, in turn, turns gear means 428 via gear chain 616. As gear means 428 turns with shaft 450, gear means 662 is also turned and thereby via gear chain 620, turns gear means 432 and gear shaft 454. Accordingly, rollers 882, 886 and 890 are thereby turned and the rollers thereby advance the pigment bar, at a predetermined rate to the comminuting means 688. The comminuting means is in turn being rotated with shaft 800 via motor 116, gear 808 attached to motor 116, chain 804 and gear 805 attached to shaft 800. Uncolored plastic pieces are entering the mixer 104 via aperture 122 from a hopper attached thereto (not shown) to be intermixed with the comminuted pigment. Baffle 162 guides a portion of the plastic pieces into the comminuted pigment to increase the intermixture thereof which intermixture then passes out of the micrometer mixer 104 via an aperture 123 to the chosen apparatus (not shown) which is to form the intermixture of plastic pieces and comminuted pigment into a pigmented plastic article.

While the invention has been described as having six rollers, it is to be understood that more or less rollers may be utilized depending upon the size and weight of the pigment bar and of the size of the apparatus as a whole. The development of an appropriate gear system will then be obvious to those skilled in the art. Although the rollers are preferably rubber for purposes of durability and efficiency in moving the pigment bar, they can be constructed from any suitable material.

The pigment bar should be cut or particulated into fine pieces or particles of pigment which are of a powder dimension. The pigment powder usually has a mean particle size of about 0.1 microns. The most preferred mean particle size for organic pigments is about 0.2 microns for organic pigments. The most preferred particle size for inorganic microns is about 50 microns. This invention will produce pigment powders in the above range of mean particle size. The above mean particle size range for the pigment powder is generally only to be used as a guide for the size of the pigment powder.

It is to be further understood that the term "molding" includes casting, thermomechanically forming, etc. It can be further seen that the comminuting means is in actuality a shaft attached to a power source capable of rotating the shaft and that a portion of the shaft is radially circumscribed by an appendage to which is attached, typically by a screw, a cutting or comminuting attachment which has at least one edge extending beyond the plane of the appendage. Typically there are two appendages circumscribing the shaft, each of which contains three such cutters or shaving attachments. In a preferred embodiment the cutting attachments are about $\frac{3}{8}$ inch square with a thickness of about $\frac{1}{8}$ inch. The radially circumscribing appendages must total less than 360° for proper fitting of the replaceable cutting means.

It is claimed:

1. An apparatus for comminuting a pigment bar to add color to a supply of plastic material prior to the molding of the plastic material, comprising:
   a. comminuting means having a rotary cutter with radially protruding discontinuous, cutting elements to comminute said pigment bars, said comminuting means having an inlet for said plastic material, and an outlet for said plastic material and said comminuted pigment;
   b. feeding means attached to said comminuting means to feed said pigment bars into said comminuting means, said feeding means having a plurality of driven rollers bearing against said pigment bars;
   c. first motor means drivingly connected to said driven rollers in said feeding means by interengaging gears;
   d. second motor means drivingly connected to said rotary cutter of said comminuting means so as to rotate said cutter;
   e. movable mounting means attaching said first motor means to said comminuting means such that said first motor may be moved out of driving connection with said driven rollers, and by disengaging said interengaging gears; and
   f. manual rotating means conected to said driven rollers such that said rollers may be rotated manually when said first motor is out of driving connection therewith.

2. The apparatus of claim 1 wherein said movable mounting means comprises:
   a. a plate pivotally attached to said comminuting means;
   b. means to attach said first motor to said plate;
   c. biasing means engaging said plate and said comminuting means to normally bias said plate in a direction such that said first motor is in driving connection with the driven rollers, and;
   d. a disengaging arm attached to said plate such that said arm may be manually moved to overcome the biasing force biasing the first motor into driving connection with said driven rollers to pivot said plate and move the first motor out of driving connection with said driven rollers.

3. The apparatus of claim 1 wherein said manual adjusting means comprises:
   a. a handwheel rotatably attached to said feeding means;
   b. a first gear connected to said handwheel so as to rotate therewith;
   c. a second gear connected to one of said driven rollers;

d. means interconnecting said driven rollers such that rotation of said one driven roller causes rotation of all of said driven rollers, and;

e. a chain interconnecting said first and second gears such that normal rotation of said handwheel causes rotation of the driven rollers.

4. The apparatus of claim 1 further comprising baffle means attached to said comminuting means between said inlet and said outlet to direct a small portion of the plastic material near said cutter so as to mix with the comminuted pigment before passing through said outlet.

5. The apparatus of claim 1 further comprising:
a. hopper means for storing a plurality of pigment bars;
b. inclined chute means attached to said hopper means and to said feeding means, and;
c. transporting means to transport said pigment bars from said hopper means to said inclined chute means such that said pigment bars slide down said chute means and into said feeding means.

* * * * *